US010797940B2

(12) United States Patent
Savino et al.

(10) Patent No.: US 10,797,940 B2
(45) Date of Patent: Oct. 6, 2020

(54) METHODS, APPARATUSES AND SYSTEMS FOR CLOUD-BASED DISASTER RECOVERY

(71) Applicant: Storage Engine, Inc., Tinton Falls, NJ (US)

(72) Inventors: Trevor Savino, Seymour, CT (US); James Patrick Hart, Brick, NJ (US); Justin Furniss, Egg Harbor City, NJ (US)

(73) Assignee: Storage Engine, Inc., Tinton Falls, NJ (US)

( * ) Notice: Subject to any disclaimer, the term of this patent is extended or adjusted under 35 U.S.C. 154(b) by 162 days.

(21) Appl. No.: 15/887,043

(22) Filed: Feb. 2, 2018

(65) Prior Publication Data
US 2019/0245736 A1 Aug. 8, 2019

(51) Int. Cl.
*H04L 12/24* (2006.01)
*H04L 12/26* (2006.01)

(52) U.S. Cl.
CPC ...... *H04L 41/0668* (2013.01); *H04L 41/0253* (2013.01); *H04L 41/0846* (2013.01); *H04L 41/5051* (2013.01); *H04L 43/0817* (2013.01)

(58) Field of Classification Search
CPC ..... H04L 41/00; H04L 41/02; H04L 41/0253; H04L 41/06; H04L 41/0627; H04L 41/0654–0668; H04L 41/08; H04L 41/0803; H04L 41/0813; H04L 41/0816; H04L 41/0836; H04L 41/0846; H04L 41/50; H04L 41/5051; H04L 43/00; H04L 43/08; H04L 43/0823
See application file for complete search history.

(56) References Cited

U.S. PATENT DOCUMENTS

| 7,383,463 | B2 * | 6/2008 | Hayden | G06F 11/2069 |
| | | | | 714/4.11 |
| 8,639,793 | B2 | 1/2014 | Kapur et al. | |
| 9,323,820 | B1 * | 4/2016 | Lauinger | H04L 67/1095 |
| 9,354,907 | B1 * | 5/2016 | Teli | G06F 12/109 |
| 9,430,337 | B1 * | 8/2016 | Gupta | G06F 11/008 |
| 9,459,892 | B2 * | 10/2016 | Anglin | G06F 9/45558 |
| 9,477,555 | B1 * | 10/2016 | Hagan | G06F 16/2453 |
| 9,495,189 | B2 * | 11/2016 | Shu | G06F 9/45533 |
| 9,692,729 | B1 * | 6/2017 | Chen | H04L 63/0272 |
| 9,971,650 | B2 * | 5/2018 | Davidson | G06F 3/0617 |

(Continued)

OTHER PUBLICATIONS

Vermande, "VMware NSX Use Case—Simplifying Disaster Recovery (Part 1)" Jul. 2014, Static-Void.io.*

(Continued)

*Primary Examiner* — Michael A Keller
*Assistant Examiner* — Boris D Grijalva Lobos
(74) *Attorney, Agent, or Firm* — Moser Taboada

(57) ABSTRACT

A method, apparatus and system for cloud-based disaster recovery include receiving, at a cloud-based computing platform, an indication of a failed client workload, in response to the failure indication, recreating the failed client workload at the cloud-based computing platform, reserving resources of the cloud-based computing platform based on the recreated client workload, creating a virtual machine of the recreated client workload in the cloud-based computing platform within the reserved resources, and enabling the virtual machine for use by the client in place of the failed client workload.

20 Claims, 8 Drawing Sheets

(56) References Cited

U.S. PATENT DOCUMENTS

| | | | |
|---|---|---|---|
| 10,372,557 B2* | 8/2019 | Subramanya Iyer Srinivas Iyer | G06F 8/71 |
| 2005/0193245 A1* | 9/2005 | Hayden | G06F 11/2069 714/13 |
| 2010/0082551 A1* | 4/2010 | Kathuria | G06F 16/24524 707/674 |
| 2011/0125894 A1* | 5/2011 | Anderson | G06F 21/31 709/224 |
| 2011/0145393 A1* | 6/2011 | Ben-Zvi | G06F 9/5011 709/224 |
| 2011/0258481 A1 | 10/2011 | Kern | |
| 2012/0117422 A1* | 5/2012 | Radhakrishnan | G06F 11/0709 714/15 |
| 2012/0136833 A1* | 5/2012 | Bartholomy | G06F 11/2028 707/644 |
| 2013/0111260 A1 | 5/2013 | Reddy et al. | |
| 2013/0212422 A1* | 8/2013 | Bauer | H04L 67/1097 714/4.1 |
| 2013/0262390 A1 | 10/2013 | Kumarasamy et al. | |
| 2014/0059379 A1* | 2/2014 | Ren | G06F 11/2069 714/15 |
| 2014/0177454 A1* | 6/2014 | Lucau | H04L 49/70 370/250 |
| 2014/0196038 A1 | 7/2014 | Kottomtharayil et al. | |
| 2014/0337471 A1* | 11/2014 | Yasuda | G06F 9/5072 709/217 |
| 2014/0359353 A1* | 12/2014 | Chen | G06F 11/1438 714/15 |
| 2015/0032817 A1* | 1/2015 | Garg | G06F 11/2035 709/204 |
| 2015/0096011 A1* | 4/2015 | Watt | H04L 63/0272 726/15 |
| 2015/0127612 A1* | 5/2015 | Balcha | G06F 11/1458 707/645 |
| 2015/0288612 A1* | 10/2015 | Smith | H04L 47/125 370/235 |
| 2015/0309829 A1* | 10/2015 | Hiltgen | G06F 9/45545 718/1 |
| 2015/0331715 A1* | 11/2015 | Sathyanarayana | G06F 9/45558 709/226 |
| 2015/0363276 A1* | 12/2015 | Banerjee | G06F 11/203 714/4.11 |
| 2015/0370502 A1* | 12/2015 | Aron | G06F 11/1446 711/162 |
| 2015/0378839 A1* | 12/2015 | Langouev | G06F 11/2097 714/19 |
| 2016/0034372 A1* | 2/2016 | Panda | G06F 11/3414 714/33 |
| 2016/0048408 A1* | 2/2016 | Madhu | G06F 11/1458 718/1 |
| 2016/0188353 A1* | 6/2016 | Shu | G06F 9/45558 718/1 |
| 2016/0299819 A1* | 10/2016 | Ray | G06F 11/2025 |
| 2017/0093642 A1* | 3/2017 | Chin | G06Q 20/30 |
| 2017/0235507 A1* | 8/2017 | Sinha | G06F 8/65 711/114 |
| 2017/0249221 A1* | 8/2017 | Jain | G06F 11/2028 |
| 2017/0289061 A1* | 10/2017 | Cudak | H04L 41/0896 |
| 2018/0165166 A1* | 6/2018 | Wang | G06F 11/203 |
| 2019/0012238 A1* | 1/2019 | Butterworth | G06F 11/1662 |
| 2019/0034298 A1* | 1/2019 | Maskalik | G06F 11/203 |
| 2019/0163372 A1* | 5/2019 | Sridharan | G06F 3/065 |
| 2020/0019479 A1* | 1/2020 | Liu | G06F 9/45558 |

OTHER PUBLICATIONS

Ahmed—VMware NSX and SRM Disaster Recovery Overview and Demo—VMware (Year: 2017).*

Fortier—VMware NSX Use Case—Simplifying Disaster Recovery (Part 1)—The Network Virtualization Blog (Year: 2014).*

Raffic—VMware Site Recovery Manager Part 6—VMWare Arena (Year: 2015).*

Rajan—How NSX Simplifies and Enables True Disaster Recovery with Site Recovery Man (Year: 2015).*

International Search Report and Written Opinion dated May 3, 2019 for Application No. PCT/US2019/015651, 11 pages.

* cited by examiner

CREATE DISTRIBUTED LOGICAL ROUTER

| LABEL | TYPE | DESCRIPTION | PROVIDED BY |
|---|---|---|---|
| Name | String | Name that will be given to the switch in NSX | SCM |
| Logical Switch Connections | Array | List of logical switches | SCM/NSX |
| Interface IP Address | String | IP address to assign to the DLR's interface | SCM |
| Interface Subnet Mask | String | Subnet Mask to assign to the DLR's interface | SCM |

CREATE LOGICAL SWITCH

| LABEL | TYPE | DESCRIPTION | PROVIDED BY |
|---|---|---|---|
| Switch Name | String | Name to be given to the LS that gets created in NSX | SCM |

CREATE DISTRIBUTED FIREWALL

| LABEL | TYPE | DESCRIPTION | PROVIDED BY |
|---|---|---|---|
| DFW Name | String | Name to be given to the DWF that gets created in NSX | SCM |

CREATE SECURITY GROUP

| LABEL | TYPE | DESCRIPTION | PROVIDED BY |
|---|---|---|---|
| Group Name | String | Name to be given to the Security Group that gets created in NSX | SCM/NSX |
| Security Group Rules | JSON | The security group rules to associate with the security group that is being created | SCM/NSX |

FIG. 3A

CREATE A SECURITY GROUP RULE

| LABEL | TYPE | DESCRIPTION | PROVIDED BY |
|---|---|---|---|
| Rule Name | String | What the security group rule will be named in NSX | SCM |
| Source | String | Source address | SCM |
| Destination | String | Destination address | SCM |
| Port | Integer | Port | SCM |
| Allow/Reject/Drop/Log | String | Allow/Reject/Drop/Log | SCM |

CREATE EDGE SERVICES GATEWAY

| LABEL | TYPE | DESCRIPTION | PROVIDED BY |
|---|---|---|---|
| ESG Name | String | What the newly create Edge will be named in NSX | SCM |
| NAT Rules | Object | A set of NAT rules that will be associate with the Edge | SCM/NSX |
| Routes | Object | A set of Routes that will associated with the Edge | SCM/NSX |
| Interfaces | Object | A set of interfaces that will associated with the Edge | SCM/NSX |

FIG. 3B

CREATE A NAT RULE

| LABEL | TYPE | DESCRIPTION | PROVIDED BY |
|---|---|---|---|
| NAT Rule Name | String | What the newly created NAT Rule will be called in NSX | SCM |
| Source NAT original address | String | Original Address of the Source NAT | SCM |
| Source NAT translated address | String | Translated Address of the Source NAT | SCM |
| Destination NAT original address | String | Original Address of the Destination NAT | SCM |

CREATE A ROUTE

| LABEL | TYPE | DESCRIPTION | PROVIDED BY |
|---|---|---|---|
| Address | String | Route Address | SCM |
| Next Hop: router address or Interface | String | The Route or interface for the Next Hop | SCM |

CREATE AN INTERFACE

| LABEL | TYPE | DESCRIPTION | PROVIDED BY |
|---|---|---|---|
| Interface Name | String | Name of the interface | SCM |
| IP Address | String | IP Address to assign to the interface | SCM |
| Subnet mask | String | Subnet mask | SCM |

FIG. 3C

RENAME VIRTUAL MACHINE

| LABEL | TYPE | DESCRIPTION | PROVIDED BY |
|---|---|---|---|
| Current VM Name or vmid | String | The name or vmid of the Virtual Machine that is to be renamed | SCM |
| New VM Name | String | The new name that will be given to the Virtual Machine | SCM |

TAG VIRTUAL MACHINE

| LABEL | TYPE | DESCRIPTION | PROVIDED BY |
|---|---|---|---|
| VM Name or vmid | String | The name or vmid of the Virtual Machine that will be Tagged | SCM |
| Tag Category Name | String | The name of the Tag Category containing the Tag(s) that are to be assigned | SCM |
| Tag Name | String | Name of the Tag that is to be assigned | SCM |

MOVE VIRTUAL MACHINE TO FOLDER

| LABEL | TYPE | DESCRIPTION | PROVIDED BY |
|---|---|---|---|
| List of VM Names or vmid's | Array/String | The array containing the names or vmid's of the VM's that need to be moved to a Folder | SCM |
| Folders | Array/String | Then name of the Folders that the VM's will be moved to | SCM |

FIG. 4A

IMPORT VIRTUAL MACHINE INTO vRA

| LABEL | TYPE | DESCRIPTION | PROVIDED BY |
|---|---|---|---|
| VM | String | The name or vmid of the Virtual Machine that will be imported from vCenter into vRA | SCM |
| vRA Host | String | The vRA instance the VM will be imported to | SCM |
| vRA Reservation | String | Name of the Reservation that the VM will be imported under | SCM |
| VM Owner | String | vRA Username of the User the VM will be assigned to once the VM has been imported into vRA | SCM |
| Identity User | String | Must be a valid username in vRA. The vRO workflow requires that "identityUser" is a user with rights to perform the Registration. Perhaps use the Service Account | SCM |
| Composite Blueprint Name | String | Name of the Composite Blueprint the VM will be imported under | SCM |
| Composite Blueprint Component Name | String | Name of the Composite Blueprint Component | SCM |
| Deployment Name | String | The name to be given to the imported VM | SCM |

FIG. 4B

METHODS, APPARATUSES AND SYSTEMS FOR CLOUD-BASED DISASTER RECOVERY

FIELD

Embodiments of the present principles generally relate to methods, apparatuses and systems for disaster recovery and a more specifically to methods, apparatuses and systems for a cloud-based disaster recovery of client data, machines and networks.

BACKGROUND

In the recent years, business organizations have seen an explosive growth in the number of computing platforms that operate within the organization's work facilities. Large volumes of data are routinely generated, stored and retrieved from storage devices. Often, the data includes critical information, without which, the operation of a business organization may suffer. In spite of the criticality of data to the operation, businesses often do not have the resources or the expertise to manage data, including operations such as regular backups and data recovery.

The Recovery Time Objective (RTO) of an application is determined by the time taken to restore a business process to full functionality after a disaster or other disruption. The RTO includes the time taken to restore machines and networks that have experienced a fault/disaster as well as establishing connectivity to the services.

There is a need to be able to quickly recover application workloads made up of machines/networks, interconnections, etc. of a data site without the expense of having to maintain and manage a second, duplicate, physical site.

SUMMARY

Embodiments of methods, apparatuses and systems for cloud-based disaster recovery are disclosed herein.

In some embodiments, a method for cloud-based disaster recovery includes receiving, at a cloud-based computing platform, an indication of a failed client workload, in response to the failure indication, recreating the failed client workload at the cloud-based computing platform, reserving resources of the cloud-based computing platform based on the recreated client workload, creating a virtual machine of the recreated client workload in the cloud-based computing platform within the reserved resources, and enabling the virtual machine for use by the client in place of the failed client workload.

In some embodiments, a cloud-based server of a cloud-based computing platform for disaster recovery includes a processor and a memory coupled to the processor. In such embodiments, the memory includes, stored therein, at least one of programs or instructions executable by the processor to configure the cloud-based server to receive an indication of a failed client workload, in response to the failure indication, recreate the failed client workload, reserve resources of the cloud-based computing platform based on the recreated client workload, create a virtual machine of the recreated client workload in the cloud-based computing platform within the reserved resources, and enable the virtual machine for use by the client in place of the failed client workload.

In some embodiments, a cloud-based computing platform for disaster recovery includes a storage device to store at least one of backup data or configuration information and a cloud-based server including a processor and a memory coupled to the processor. In such embodiments, the memory includes, stored therein, at least one of programs or instructions executable by the processor to configure the cloud-based server to receive an indication of a failed client workload, in response to the failure indication, recreate the failed client workload, reserve resources of the cloud-based computing platform based on the recreated client workload, create a virtual machine of the recreated client workload in the cloud-based computing platform within the reserved resources, and enable the virtual machine for use by the client in place of the failed client workload.

Other and further embodiments of the present principles are described below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the present principles and are therefore not to be considered limiting of scope, for the present principles may admit to other equally effective embodiments.

FIG. 3A-3C depict tables providing examples of devices and functionalities of a failed machine and/or network and some inputs required for recreating the devices and functionalities in accordance with an embodiment of the present principles.

FIG. 4A-4B depict tables providing examples of inputs and information required for renaming, tagging, moving to a folder and importing a virtual machine into vRA and a source of the inputs and information in accordance with an embodiment of the present principles.

Figure 1:
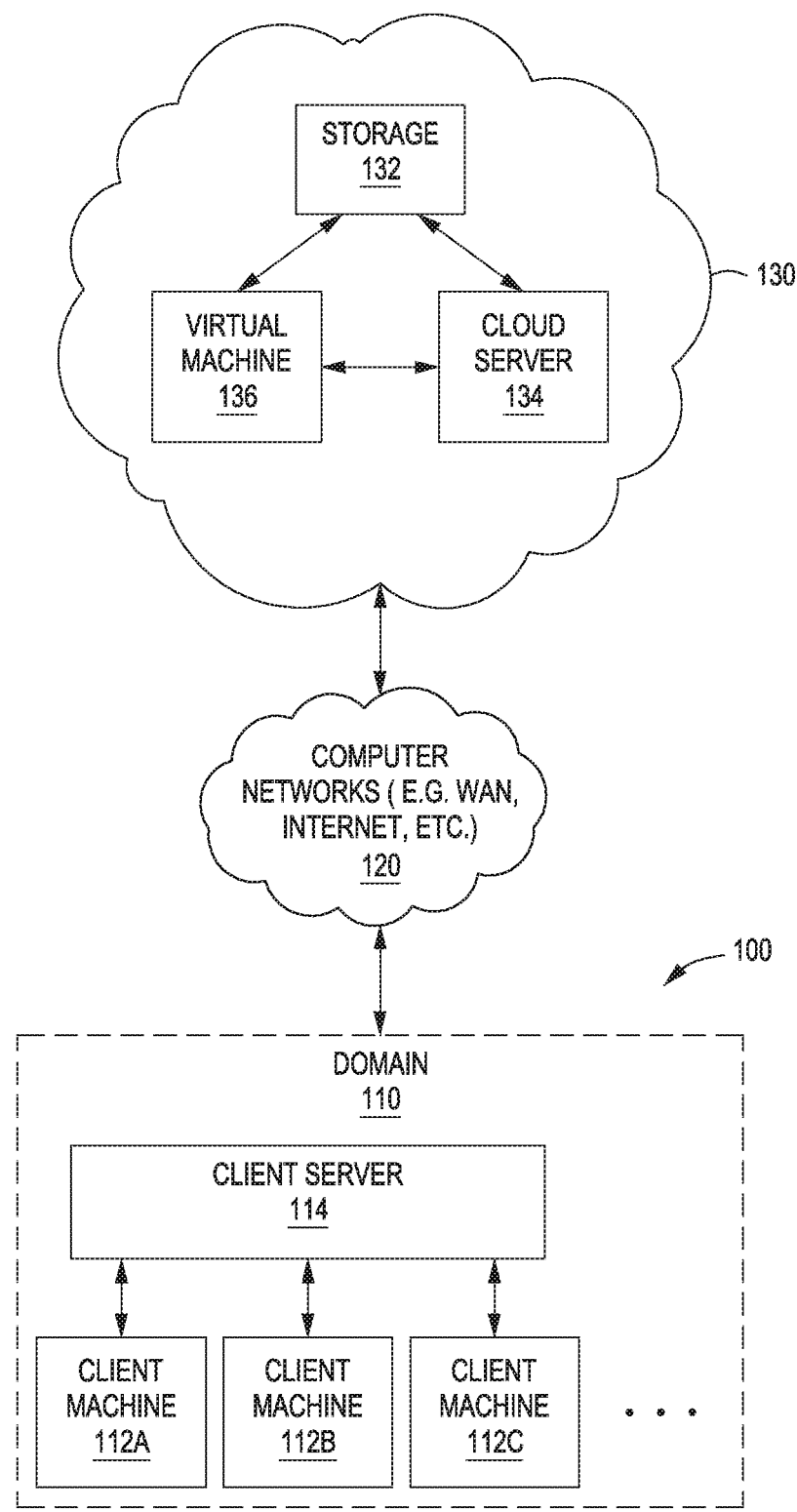
FIG. 1 depicts a high level block diagram of a cloud-based disaster recovery system in accordance with an embodiment of the present principles.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

In the following detailed description, numerous specific details are set forth in order to provide a thorough understanding of exemplary embodiments or other examples described herein. However, these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed. For example, although embodiments of the present principles are described with respect to VMware implementing various aspects of the present principles, other applications, such as Microsoft Azure or Hyper-V, can be implemented in accordance with various embodiments of the present principles.

Embodiments of the present principles provide methods, apparatuses and systems for cloud-based recovery of client data, machines and networks in the event of a disaster.

Exemplary definitions are provided below to assist in understanding the embodiments of the present principles.

A backup, or the process of backing up, can refer to the copying and/or archiving of computer data so the copied data can be used to restore the original after a data loss event.

Cloud computing can refer to computing that can involve a large number of computers connected through a communication network such as the Internet. Cloud computing can be a form of distributed computing over a network, and can include the ability to run a program or application on many connected computers at the same time.

Cloud storage can refer to a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Reservation can refer to a degree to which a cloud-computing system is able to adapt to workload changes by provisioning and de-provisioning resources in an autonomic manner, such that at each point in time the available resources match the current demand as closely as possible.

Disaster Recovery as a service (DRaaS) can refer to the use of physical machines, virtual machines, and/or other resources to perform disaster recovery offered with a cloud-service model.

Virtual machine (VM) can refer to a software-based emulation of a computer. Virtual machines can operate based on the computer architecture and functions of a computer.

Workload as used herein can refer to groups of machines including, for example, servers, networks, firewalls, etc., and all other devices and interconnections between the groups of machines of a client site or sites.

FIG. 1 depicts a high level block diagram of a cloud-based disaster recovery system for providing DRaaS in accordance with an embodiment of the present principles. The cloud-based disaster recovery system 100 of FIG. 1 illustratively comprises a client domain 110, at least one computer network 120 and a cloud-based computing platform 130. In the embodiment of FIG. 1, the client domain 110 includes at least one client machine 112A-112O (collectively client machines 112) and an onsite client server 114. In the embodiment of FIG. 1, the computer network 120 illustratively comprises at least one computer network such as a wide-area network (WAN), an Internet and other networks implemented for communication by the client domain 110. The cloud-based computing platform 130 of FIG. 1 illustratively includes a cloud-based storage means 132, at least one cloud-based server 134 and a virtual machine 136 representing virtualized client workloads.

Although in FIG. 1, the cloud-based server 134 is depicted as a physical device, in various embodiments in accordance with the present principles, the cloud-based server 134 is intended to be representative of applications and servers for implementing the various aspects of the present principles. For example, in one embodiment in which VMware is implemented, the cloud-based server 134 of FIG. 1 can represent at least one of a host machine, a vCenter Server to manage installations and handle inventory objects, a VMware vCenter server, which is a centralized management application that enables a client to manage virtual machines and ESXi hosts centrally, a vSphere client, used to access a vCenter Server and ultimately manage ESXi servers, a VMware vSphere application which includes a VMware ESX/ESXi hypervisor that functions as the virtualization server and any other application or server necessary for implementing the processes of the present principles as described herein.

Additionally, although in FIG. 1, the virtual machine 136 is depicted as a single, physical device, in various embodiments in accordance with the present principles, the virtual machine 136 of FIG. 1 is intended to represent a virtualized workload of a client as described in greater detail below. Even further, although in FIG. 1, the client machines 112 are depicted as a separate, physical devices, in various embodiments in accordance with the present principles, the client machines 112 of FIG. 1 are intended to represent a client workload including servers, networks, firewalls, etc., and all other machines and interconnections of a client domain or domains 110. In addition, although in FIG. 1, the cloud storage means 132 is depicted as a single, physical device, in various embodiments in accordance with the present principles, the cloud-based storage means 132 is intended to represent cloud storage which can span multiple servers and can be accessed by clients over the internet. A physical environment associated with cloud storage is typically owned and managed by a hosting company.

In one embodiment in accordance with the present principles, a client in the client domain 110 can interact via a user interface (not shown) of, for example, the client server 114 through the computer network 120 with a web-based application of the present principles stored and executed via, for example, the at least one cloud-based server 134 of the cloud-based computing platform 130. For example, in one embodiment in which VMware is implemented, VMware vSphere Web Client is implemented as a web-based application to connect a client to the cloud-based server 134 (i.e., in one embodiment a vCenter Server) to provide information and manage created workloads.

Using the user interface and the web-based application, a client can communicate to the at least one cloud-based server 134 of the cloud-based computing platform 130, the details of the workload of the client domain 110. That is, a client communicates to the at least one cloud-based server 134 of the cloud-based computing platform 130 the details of the servers, networks, firewalls, etc., and all other machines and interconnections (e.g., the workload) of a client domain or domains 110. Subsequent to the workload information being uploaded to the cloud-based computing platform 130, a client can communicate, via the user interface and the web-based application, an indication of the failure of a device or devices of the client domain 110 over the computer network 120 to the at least one cloud-based server 134 of the cloud-based computing platform 130.

After the failed client workloads (machine(s) 112, network(s), interconnections, etc.) to be recovered are identified by a respective client, using for example the user interface and the web-based application, the identified workloads are restored in the cloud-computing platform 130 and made available for use by the client in accordance with a process of the present principles and as described below.

Figure 2:
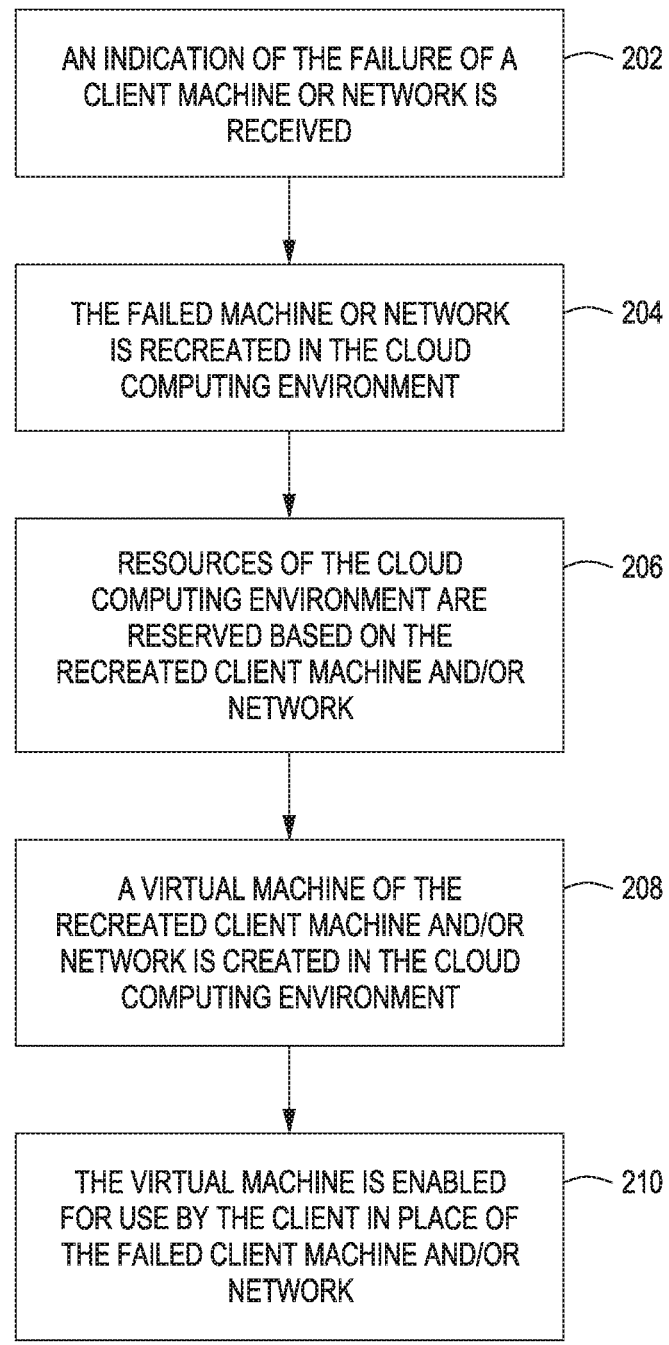
FIG. 2 depicts a flow diagram of a method 100 for disaster recovery in accordance with an embodiment of the present principles.

FIG. 2 depicts a flow diagram of a method 200 for disaster recovery in accordance with an embodiment of the present principles. The method 200 of FIG. 2 begins at 202 during which an indication of the failure of a client workload (e.g., a machine, network, interconnections, etc.) is received. In one embodiment, in which VMware is implemented, the failure indication is received from a remote client by an SCM local to the cloud-based computing platform 130. As described above, in some embodiments the indication of failure can be received from a client using an interface device and a web application of the present principles to identify/select client workloads to be recovered. The method 200 can proceed to 204.

At 204, the requesting client's identified failed workload is recreated in the cloud-based computing platform 130. The failed workload is recreated using information regarding the interconnections, devices and functionality of the failed workload previously provided by the client. For example, the tables in FIGS. 3A-3C provide examples of devices and functionalities of a failed workloads and information required for recreating each of the devices and functionalities. As depicted in FIGS. 3A-3C, failed workloads that can be recreated include a distributed logical router, a logical switch, a distributed firewall, a security group, security group rules, an edge service gateway, a NAT rule, a route, and an interface, to name a few. As depicted in FIGS. 3A-3C, some of the information provided by the client for recreating the workloads can include names, addresses, group rules, interfaces, routes and the like, necessary for configuring the workload of a client, which can include all devices, interconnections and networks of a client. FIGS. 3A-3C provide examples of information provided by the client and should not be considered a complete listing. Other information may need to be provided by a client to recreate a client's workload in accordance with the present principles.

In one embodiment in accordance with the present principles in which VMware is implemented, upon receiving a failure indication from a client, SCM triggers a vRO workflow to recreate the identified, failed workload in NSX. The SCM passes all required inputs to vRO workflows to recreate the required components. In instances in which the SCM does not have all of the required information, the SCM can provide a REST API so that vRO can obtain the missing, required information, for example, by in one embodiment requesting such information from the client via, for example, the web application and a user interface of the client server 114.

Referring back to the method 200, after the failed workload(s) (e.g., machine and/or network and interconnections) are recreated, the method 200 can proceed to 206. At 206, a reservation is made for the recreated machine and/or network. That is, after the failed workload is recreated, cloud resources (e.g., processing and memory resources) necessary for implementing the recreated workload(s) are reserved as a host environment for the failed workload(s). In one embodiment in accordance with the present principles in which VMware is implemented, a reservation is created in vRA based on the restoration requirements provided by SCM. More specifically, when implementing VMware, all restoration requirements and metadata that is required to create the Reservation is obtained via the vRA REST API. The Reservation is created by making a POST request to the vRA REST API with the necessary JSON data. In such embodiments, the vRA Service Account must be a fabric group administrator to create Reservations using vRA's REST API. The method 200 can proceed to 208.

At 208, the identified, failed workload(s) is restored by creating a virtual machine 136 of the failed workload(s). In one embodiment in accordance with the present principles in which VMware is implemented, the virtual machine(s) 136 is created in the vCenter one at a time in a respective host environment. In one embodiment in accordance with the present principles, Commvault software is implemented to create the virtual machine(s) 136 in vCenter. That is, in one embodiment in accordance with the present principles, a Commvault application is triggered via an API to restore the virtual machine(s) 136 into vCenter on a specific host. The method 200 can proceed to 210.

At 210, once a virtual machine(s) 136 is created, the created virtual machine(s) 136 is made available for use by the client. In one embodiment in accordance with the present principles in which VMware is implemented, once the virtual machine(s) 136 is created, SCM triggers a vRO workflow to rename the virtual machine(s) 136. That is, a created virtual machine is renamed to ensure that there are unique names for all of the virtual machines created in the cloud-based computing platform 130. In such embodiments, respective information for a created virtual machine can be obtained from SCM and an out-of-Box vRO Workflow, "Rename Virtual Machine", can be used to rename the virtual machine(s) 136.

Additionally, in some embodiments the created virtual machine(s) 136 can be tagged with identification information of the original client machine for which the virtual machine was created for identification purposes by, for example, a respective client. In embodiments in which VMware is implemented, an out-of-Box vRO Workflow, "Associate vSphere Tag with VM", can be used to tag the created virtual machine(s) 136 with respective information.

In some embodiments in accordance with the present principles, the created virtual machine(s) 136 is associated with an appropriate client folder in the cloud-based computing platform 130. In embodiments in which VMware is implemented, an out-of-Box vRO Workflow, "Move VMs to Folder", can be used to move/associate the virtual machine(s) 136 with a respective client folder.

The created virtual machines(s) 136 is then enabled for access by the respective client(s). As previously described, in some embodiments, the workload information previously provided by client(s) is used to configure interconnections between machines 112 in a client domain 110 and the created virtual machine(s) 136 in the cloud-based computing platform 130. A client is then able to use a user interface and the web-based application program of the present principles to implement the created respective virtual machine(s) 136 resident in the cloud-based computing platform 130 in place of an identified, failed client workload(s). In embodiments in which VMware is implemented, an out-of-Box vCenter Workflow, "Import vCenter Virtual Machine", can be used to move the created virtual machine(s) from the vCenter to the vRA for access by a respective client(s). In some embodiments, a client is notified when a created virtual machine(s) is moved from the vCenter to the vRA. The method 200 can then be exited.

FIG. 4A-4B depict tables providing examples of inputs and information required for renaming, tagging, moving to a folder and importing a virtual machine into vRA and a source of the inputs and information in accordance with an embodiment of the present principles. For example and as depicted in FIG. 4A, to rename a virtual machine, a string including the name of the virtual machine to be renamed and a string including a new name for the virtual machine must be provided. In addition and as also depicted in FIG. 4A, to move a created virtual machine to a client folder, an array or string containing the name(s) or vmid(s) of the virtual machines to be moved must be provided and a name of the client folder(s) to which to move the virtual machine(s) must be provided.

As depicted in FIG. 4B, to move the created virtual machine(s) from the vCenter to the vRA, at least some of the following, the name or vmid of the virtual machine(s) that will be imported from vCenter into vRA, the vRA instance to which the virtual machine(s) will be imported, the name of the Reservation under which the virtual machine(s) will be imported, the vRA Username of the user to which the virtual machine will be assigned once the virtual machine has been imported into vRA, the name of the Composite Blueprint under which the virtual machine will be imported and the name to be given to the imported virtual machine must be provided. FIGS. 4A and 4B provide examples of information provided by the client and should not be considered a complete listing. Other information may need to be provided by a client to make available the created virtual machine(s) 136 to a client in accordance with the present principles.

After a created virtual machine(s) has been moved to the vRA, a client can be notified that the created virtual machine is ready for client interaction. In one embodiment in which VMware is implemented, after a created virtual machine(s) has been moved to the vRA, an SCM status view is updated to reflect the ready status. Subsequently, a client can be notified of the ready status via, for example, a web-based application and user interface as described above.

In some embodiments, a system in accordance with the present principles can, in addition to workload recovery, provide data backup and recovery for client data. Referring back to FIG. 1, in such embodiments, the client server 114 can be configured to provide a copy of the data of the client machines 112 to the cloud-based computing platform 130 for storage in, for example, the cloud storage means 132 and/or the cloud-based server 134 of FIG. 1. In such embodiments, the cloud-based computing platform 130 will further include applications in, for example the cloud-based server 134 or the cloud-based storage means 132, for managing backup functions and performing cloud-based restores of the client data. In such embodiments, with the indication of the failure of a client workload, the client can further provide information to determine a restore point from which client data should be recovered. Restored data of respective client devices can then be provided with the restoration of an identified, failed client workload from the identified restoration point.

Alternatively or in addition, an optional dedicated onsite appliance (not shown) can be provided at the client site 110 for providing copies of client data to the cloud-based computing platform 130 in place of the client server 114. In such embodiments, the onsite appliance can include applications for managing backup functions and performing cloud-based restores of the client data.

Figure 5:
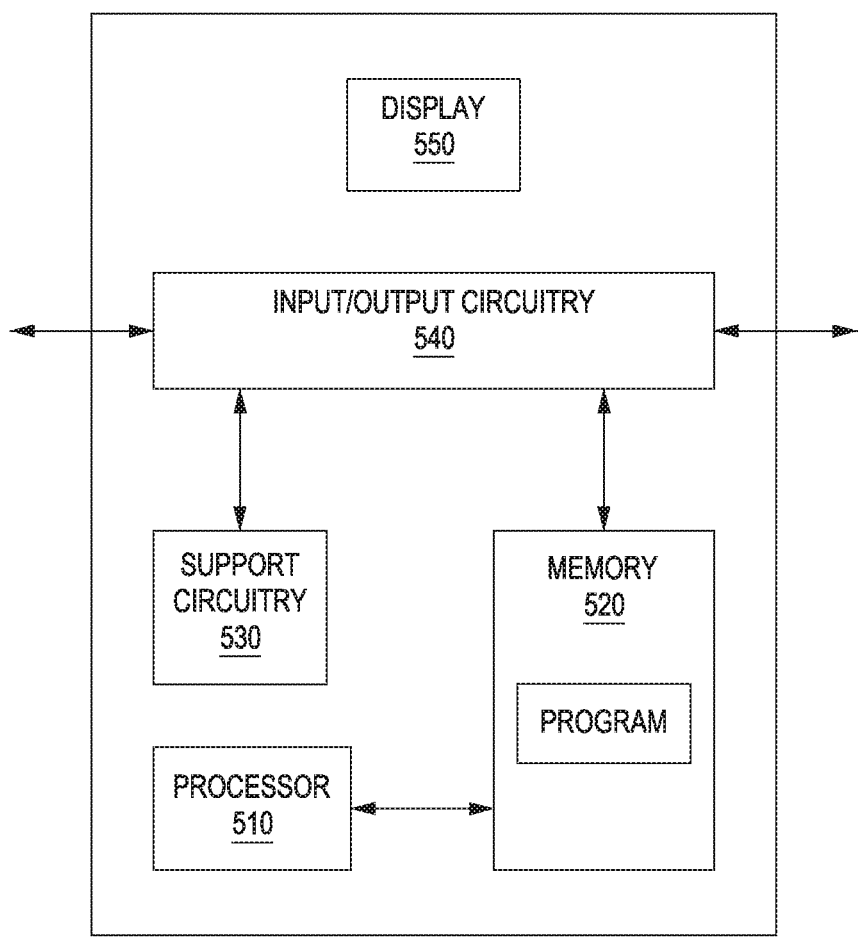
FIG. 5 depicts computing system with a number of components that may be used to perform any of the processes described herein in accordance with an embodiment of the present principles.

FIG. 5 depicts computing system 500 capable of performing the above described functions and processes of a server, such as the client server 114 and/or the cloud-based server 134, in accordance with an embodiment of the present principles. The computing system 500 of FIG. 5 illustratively comprises a processor 510, which can include one or more central processing units (CPU), as well as a memory 520 for storing control programs, configuration information, backup data and the like. The processor 510 cooperates with support circuitry 530 such as power supplies, clock circuits, cache memory and the like as well as circuits that assist in executing the software routines/programs stored in the memory 520. As such, some of the process steps discussed herein as software processes may be implemented within hardware, for example, as circuitry that cooperates with the processor 510 to perform various steps. The computing system 500 also contains an input-output circuitry and interface 540 that forms an interface between the various functional elements communicating with the computing system 500. For example, in some embodiments the input-output circuitry and interface 540 can include or be connected to an optional display 550, a keyboard and/or other user input (not shown). The input-output circuitry and interface 540 can be implemented as a user interface for interaction with the computing system 500.

The computing system 500 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing system 500 can further include a web browser.

Although the computing system 500 of FIG. 5 is depicted as a general purpose computer, the computing system 500 is programmed to perform various specialized control functions in accordance with the present principles and embodiments can be implemented in hardware, for example, as an application specified integrated circuit (ASIC). As such, the process steps described herein are intended to be broadly interpreted as being equivalently performed by software, hardware, or a combination thereof.

While the foregoing is directed to embodiments of the present principles, other and further embodiments may be devised without departing from the basic scope thereof. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A method for cloud-based disaster recovery, comprising:
receiving, at a cloud-based computing platform, a failure indication of a client workload;
in response to the failure indication, recreating the failed client workload, including at least all devices, interconnections, and functionality of the failed client workload at the cloud-based computing platform and, based on the recreating, determining an amount of resources of the cloud-based computing platform necessary for implementing the failed client workload within the cloud-based computing platform;
reserving the amount of resources of the cloud-based computing platform based on the recreated client workload;
creating a virtual machine of the recreated client workload in the cloud-based computing platform within the reserved resources; and
enabling the virtual machine for use by a client in place of the failed client workload, wherein the virtual machine is renamed and tagged with identification information of the client.

2. The method of claim 1, wherein the failed client workload is recreated using configuration information of the workload previously provided by the client.

3. The method of claim 2, wherein at least one of the failure indication or the configuration information of the workload is provided by the client using a web-based application.

4. The method of claim 1, wherein the reserved resources of the cloud-based computing platform comprise processing and memory resources.

5. The method of claim 1, further comprising restoring data of the failed client workload stored in the cloud-based computing platform.

6. A cloud-based server of a cloud-based computing platform for disaster recovery, comprising:
   a processor; and
   a memory coupled to the processor, the memory having stored therein at least one of programs or instructions executable by the processor to configure the cloud-based server to:
   receive an indication of a failure of a client workload;
   in response to the received failure indication, recreate the failed client workload, including at least all devices, interconnections, and functionality of the failed client workload, and based on the recreated, failed client workload determine an amount of resources of the cloud-based computing platform necessary for implementing the failed client workload within the cloud-based computing platform;
   reserve the amount of resources of the cloud-based computing platform based on the recreated client workload;
   create a virtual machine of the recreated client workload in the cloud-based computing platform within the reserved resources; and
   enable the virtual machine for use by a client in place of the failed client workload, wherein the virtual machine is renamed and tagged with identification information of the client.

7. The cloud-based server of claim 6, wherein the failed client workload is recreated using configuration information of the workload previously provided by the client via a web-based application.

8. The cloud-based server of claim 7, wherein the web-based application is resident in the cloud-based server.

9. The cloud-based server of claim 6, wherein the failure indication is provided to the cloud-based server by the client using a web-based application resident in the cloud-based server.

10. The cloud-based server of claim 6, wherein the reserved resources of the cloud-based computing platform comprise processing and memory resources.

11. The cloud-based server of claim 6, wherein the cloud-based server is further configured to restore data of the failed client workload stored in the cloud-based computing platform.

12. A cloud-based computing platform for disaster recovery, comprising:
   a storage device to store at least one of backup data or configuration information; and
   a cloud-based server, comprising:
      a processor; and
      a memory coupled to the processor, the memory having stored therein at least one of programs or instructions executable by the processor to configure the cloud-based server to:
      receive an indication of a failure of a client workload;
      in response to the received failure indication, recreate the failed client workload, including at least all devices, interconnections, and functionality of the failed client workload, and based on the recreated, failed client workload determine an amount of resources of the cloud-based computing platform necessary for implementing the failed client workload within the cloud-based computing platform;
      reserve the amount of resources of the cloud-based computing platform based on the recreated client workload;
      create a virtual machine of the recreated client workload in the cloud-based computing platform within the reserved resources; and
      enable the virtual machine for use by a client in place of the failed client workload, wherein the virtual machine is renamed and tagged with identification information of the client.

13. The cloud-based computing platform of claim 12, wherein the failed client workload is recreated using configuration information of the workload previously provided by the client.

14. The cloud-based computing platform of claim 13, wherein at least one of the failure indication or the configuration information of the workload is provided by the client via a web-based application resident in the cloud-based server.

15. The cloud-based computing platform of claim 14, wherein the client interacts with the web-based application via a user interface of a client server at a client site.

16. The cloud-based computing platform of claim 12, wherein the reserved resources of the cloud-based computing platform comprise processing and memory resources.

17. The cloud-based computing platform of claim 12, further comprising a cloud-based storage means to store back-up data of client machines.

18. The cloud-based computing platform of claim 17, wherein the back-up data of the client machines is communicated to the cloud-based computing platform from a server at a client site.

19. The cloud-based computing platform of claim 17, wherein the cloud-based server is further configured to restore data of the failed client workload stored in the cloud-based computing platform.

20. The cloud-based computing platform of claim 19, wherein the data of the failed client workload is restored at a point in time identified by information provided by a client.

* * * * *